United States Patent [19]
Gold et al.

[11] Patent Number: 5,963,977
[45] Date of Patent: Oct. 5, 1999

[54] BUFFER MANAGEMENT AND SYSTEM COORDINATION METHOD

[75] Inventors: Clifford M. Gold; Hang D. Nguyen, both of Fremont; George Li, Santa Clara; Minnie Uppuluri, San Jose; Hoa Luong, Fremont; Steve Paul, Santa Cruz; Bryan Mee; Trinh Bui, both of San Jose, all of Calif.

[73] Assignee: Quantum Corporation, Milpitas, Calif.

[21] Appl. No.: 08/947,213

[22] Filed: Oct. 9, 1997

[51] Int. Cl.⁶ ...................................................... G06F 12/00
[52] U.S. Cl. .......................... 711/156; 711/154; 711/209; 711/220; 711/208
[58] Field of Search ................................... 711/4, 156, 5, 711/144, 146, 212, 220, 169, 208, 209; 395/376, 595

[56] References Cited

U.S. PATENT DOCUMENTS

| | | | |
|---|---|---|---|
| 5,619,673 | 4/1997 | Wang ........................................ | 711/145 |
| 5,675,765 | 10/1997 | Malamy et al. ......................... | 711/144 |
| 5,737,757 | 4/1998 | Hassoun et al. ......................... | 711/156 |
| 5,764,938 | 6/1998 | White et al. .............................. | 395/376 |
| 5,802,546 | 9/1998 | Chisholm et al. ....................... | 711/156 |
| 5,812,775 | 9/1998 | Van Seters et al. ............... | 395/200.43 |
| 5,835,925 | 11/1998 | Kessler et al. ........................... | 711/212 |
| 5,860,119 | 1/1999 | Dockser .................................. | 711/156 |

OTHER PUBLICATIONS

Yeon Seung Ryu et al., "Dynamic Buffer Management Technique for Minimizing the Necessity Buffer Space in a Continuous Media Server", Proceedings of Multimedia '96, pp. 181–185, 1996.

Kun–Lung Wu et al., "Consumption–Based Management Buffer for Maximizing System Throughout of Multimedia System", Proceedings of Multimedia '96, IEEE Transactions, pp. 164, 171, 1996.

David X. Chen et al., "A Buffer Management Scheme for the SCQQ Switch Under Nonuniform Traffic Loading", IEEE Transactions, pp. 2899–2907, 1994.

*Primary Examiner*—John W. Cabeca
*Assistant Examiner*—Pierre-Michel Bataille
*Attorney, Agent, or Firm*—Michael Zarrabian

[57] ABSTRACT

A method of coordinating access to a data buffer including a plurality of data blocks, using a buffer list with a plurality of entries corresponding to the data blocks. Each buffer list entry includes: (i) a status code for indicating the status of data in the corresponding data block, and (ii) a partial address common to both the next buffer list entry and a data block corresponding to said next buffer list entry. A status code is selected from a cyclical set of sequential status codes having a period of N, the status codes sequentially, and alternately, representing the most recent history of a data block, including: (i) full status, indicating data in the data block has been retrieved from the storage device or is to be stored to the storage device, or (ii) empty status, indicating data transferred out of the data block to a host or to the storage device. A store flag maintains a status code representing empty status, and a retrieve flag maintains a status code representing full status. When storing data into the data buffer, locating a desired buffer list entry list with an empty status code by traversing the buffer list, calculating the address of each entry using the partial address in the previous entry, until the desired entry is found. The address of the data block corresponding to the found entry is calculated and data is stored in the data block when the status code of the entry matches the store flag status code. The found entry status code is advanced once, and if the entry is last in the buffer list the store flag status code is advanced twice. Similarly, when retrieving data from the data buffer, locating a desired entry in the buffer list with a full status code by traversing the buffer list, calculating the address of each entry using the partial address in the previous entry, until the desired entry is found. The address of the data block corresponding to the found entry is calculated and data is retrieved from the data block when the status code of the entry matches the retrieve flag status code. The found entry status code is advanced once, and if the entry is last in the buffer list the retrieve flag status code is advanced twice.

22 Claims, 6 Drawing Sheets

|   | BIT 7 | BIT 6 | BIT 5 | BIT 4 | BIT 3 | BIT 2 | BIT 1 | BIT 0 |
|---|---|---|---|---|---|---|---|---|
| 0: | Reserved | ECC0 | Opcode 0(1:0) | Next Offset (3:0) | | | | |
| 1: | Reserved | ECC1 | BIT 13 | BIT 12 | BIT 11 | BIT 10 | BIT 9 | BIT 8 |
| | | | Opcode 1(1:0) | Next Offset (7:4) | | | | |
| 2: | Reserved | ECC2 | Opcode 2(1:0) | RESERVED | BIT 3 | BIT 2 | BIT 1 | BIT 0 |
| | BIT 15 | BIT 14 | BIT 13 | BIT 12 | BIT 11 | Next Offset (10:8) | | |
| 3: | Interrupt | ECC3 | Opcode 3(1:0) | Host Sectors Unused (1:0) | Expected Opcode Delta | | | |
| | BIT 15 | BIT 14 | BIT 13 | BIT 12 | BIT 11 | BIT 10 | BIT 9 | BIT 8 |

BUFFER MANAGEMENT AND SYSTEM COORDINATION METHOD

FIELD OF THE INVENTION

The present invention relates to data transfer between a host device and a storage device. More particularly, the invention relates to a method for coordinating data transfer between a host device and a storage device through data buffer management.

BACKGROUND

Storage devices are essential components of many computer and information systems. Typically, a data buffer system is utilized to manage transfer of data between a host and a storage device such as a disk drive. The data buffer system includes a data buffer for storing data retrieved from or to be stored in the disk drive. The data buffer typically includes several data blocks for storage of data.

In some systems, a buffer list is utilized to manage the status and location of the data blocks in the buffer. The buffer list includes several entries each corresponding to a data block and containing information about the data block. Each buffer list entry contains the full memory address of a corresponding data block or sector in memory. Therefore, if a host command requires access to the 10th sector in memory, the 10th buffer list entry is accessed to obtain the memory address of the 10th sector. However, storing full block addresses in the buffer list entries occupies large amounts of precious memory space. Further, rearranging the buffer list requires rewrite of at least a portion of the list. For example, if the buffer list is to be split into two sections, a new link entry has to be added to the end of one section to link it to the other section. This requires a rewrite of at least one section of the buffer list to open up space in memory for the new link entry.

To coordinate the interaction between the host and the disk drive in storing data into, or retrieving data from, the data blocks, each buffer list entry further includes a status field representing the status of data in a corresponding data block. The status fields allow the host and disk drive to coordinate their interaction by informing one another of each others' actions on data blocks via status codes. However, a disadvantage of such systems is that each status code represents a unique status and a unique action to be performed next by the host or the task drive. The same status code cannot be reused for different actions. Therefore, from one use of a data block by one task to the next, the status code in the corresponding buffer list entry must be re-written with a different status code. The frequent re-writing of the status codes in the buffer list entries is time consuming and reduces data transfer rates between the host and the disk drive.

In systems without a buffer list, when the disk drive receives a read or a write request from the host, in satisfying the request, the disk drive monitors several conditions including the status of the data coming off of or on to the disk drive, the status of the host interface, and the status of the data buffer during the entire operation. The disk drive then notifies the host when the request is satisfied. The monitoring and notification is performed by a programmed microprocessor in the disk drive controller. The microprocessor monitors a status change due to completion of one task (e.g., a sector has been transferred from the disk by the disk drive) and notifies the other task of the status change (e.g., notifies the host that the sector is now available for transfer by updating the status code in the corresponding buffer list entry). A major disadvantage of such systems is that the microprocessor driven monitoring and notification actions significantly reduce data transfer rates due to large delays inherent in microprocessor processing.

There is, therefore, a need for an efficient and flexible method of managing data in a data buffer. There is also a need for an efficient method of coordinating data transfer between a host and a disk drive through the data buffer.

SUMMARY

The present invention satisfies these needs. In one embodiment, the present invention provides an efficient method of managing data in a data buffer including a plurality of data blocks for storing data. A buffer list comprising a plurality of entries, each corresponding to a data block, is utilized to keep track of the data blocks in the data buffer. To access a buffer list entry and the corresponding data block, a partial address, common to both the buffer list entry and the corresponding data block, is used to calculate both the address of the buffer list entry and the address of the corresponding data block.

Each buffer list entry includes a partial address common to both the next buffer list entry and a data block corresponding to the next buffer list entry. A partial address common to both an entry and the corresponding data block is stored in an offset register, and the buffer list base address is stored in a buffer list base address register. The address of the buffer list entry is calculated by steps including adding the partial address in the offset register to the buffer list base address in the buffer list base address register. The address of the corresponding data block is calculated by steps including multiplying the partial address in the offset register with the data block size.

Since each entry in the buffer list includes a partial address common to both the next buffer list entry and the data block corresponding to that next entry, traversing the buffer list includes storing into the offset register, the partial address in a buffer list entry, and repeating the address calculation steps above to obtain addresses of the next buffer list entry and its corresponding data block. The addressing and access method of the present invention is advantageous since it eliminates the need to store full data block addresses in the buffer list entries, conserving precious memory space. Further, rearranging the buffer list is simple, requiring at most update of a few partial addresses in a few buffer list entries.

In another aspect, the present invention also provides a method of coordinating storing data into, and retrieving data from, the data buffer by the host and by the disk drive. The data buffer includes a plurality of data blocks for storing data retrieved from, or to be stored in, the disk drive. A buffer list is used to keep track of the data blocks. The buffer list includes a plurality of entries each for maintaining a status code indicating the status of data in a corresponding data block. The status code is selected from a cyclical set of sequential status codes. The status codes sequentially, and alternately, represent the most recent history of data in a data block, including: (i) full status, indicating data in the data block has been retrieved from the disk drive or is to be stored to the disk drive, or (ii) empty status, indicating data has been transferred out of the data block to the host or to the disk drive. A store flag maintains a status code from the cyclical set representing empty status, and is used by tasks storing data into a data block, for example, by the host in a write case and by the disk drive in a read case. A retrieve flag maintains a status code from the cyclical set representing full status, and is used by tasks retrieving data from a data block, for example, by the host in a read case and by the disk drive in a write case. The retrieve flag status code immediately follows, or immediately precedes, the store flag status code in the cyclical set. The buffer list and the flags are used to coordinate the interaction between a host task transferring data to and from the host, and a disk task transferring data to and from the disk drive.

Initially, each buffer list entry is set to a status code representing empty status. Thereafter, storing data into the data buffer comprises the steps of: (i) locating in the buffer list a desired entry; (ii) storing data into the corresponding data block when the status code of the entry matches the store flag status code, representing a corresponding empty data block; (iii) updating the entry with a status code from the cyclical set next in sequence to the store flag status code, indicating the data block is full; and (iv) if the entry is at the end of the buffer list, updating the store flag to a status code immediately following the next consecutive status code in the cyclical set. This step is equivalent to advancing the current store flag status code in the cyclical set twice.

Retrieving data from the data buffer comprises the steps of: (i) locating in the buffer list a desired entry; (ii) retrieving data from the corresponding data block when the status code of the entry matches the retrieve flag status code, representing a corresponding full data block; (iii) updating the entry with a status code from the cyclical set next in sequence to the retrieve flag status code, indicating the data block is empty; and (iv) if the entry is at the end of the buffer list, updating the retrieve flag to a status code immediately following the next consecutive status code in the cyclical set. This step is equivalent to advancing the current retrieve flag status code in the cyclical set twice.

Preferably, a logic circuit is configured with program instructions to perform the steps of: (1) managing and providing access to the data buffer data blocks, and (2) coordinating storing data into, and retrieving data from, the data blocks, described above. A dedicated logic circuit, provides higher performance than a microprocessor since the logic is implemented directly in the circuit rather than using an instruction set requiring multiple clock cycles to be executed by a microprocessor. Further, the microprocessor typically executes several different tasks which can delay prompt updating of the flags for increased throughput. By automating store and retrieve coordination, several operations, not possible with a purely microprocessor driven approach, become possible. Such operations include out-of-order transfers from the disk (Zero Rotational Latency) and storing data in the data buffer in complex out of order schemes, such as advanced buffer allocation. The present invention removes the microprocessor from any real-time control of the communication between the host and the disk drive through use of the data buffer.

BRIEF DESCRIPTION OF THE DRAWINGS

These and other features, aspects and advantages of the present invention will become better understood with regard to the following description, appended claims and accompanying drawings where:

DESCRIPTION

Figure 1:
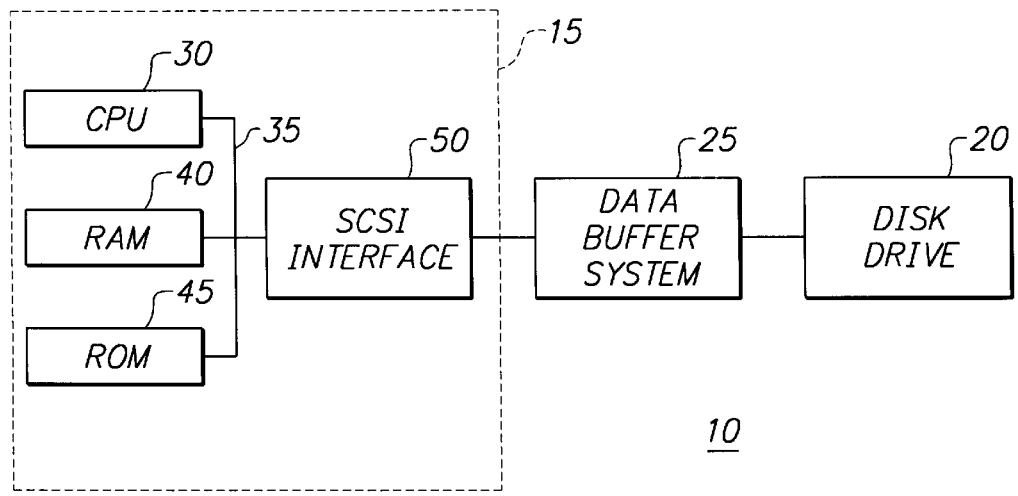
FIG. 1 shows a block diagram of an example computer architecture in which the present invention can be implemented.

FIG. 1 shows a block diagram of an example computer system 10 in which a method embodying aspects of the present invention can be implemented. The computer system 10 typically includes a host 15 and a storage device, such as a disk drive 20, interconnected via a data buffer system 25. The data buffer system 25 is utilized to manage transfer of data between the host 15 and the disk drive 20 according to the present invention. As those skilled in the art will recognize, the present invention is capable of being implemented in a system having other storage devices. Additionally, the host 15 generally refers to a host/SCSI interface, which one skilled in the art will recognize to include, for example, a CPU 30 interconnected via a BUS 35 to ROM 40, RAM 45 and a SCSI interface 50. The present invention can also be utilized in a system having a plurality of hosts 15 and disk drives 20.

Figure 2:
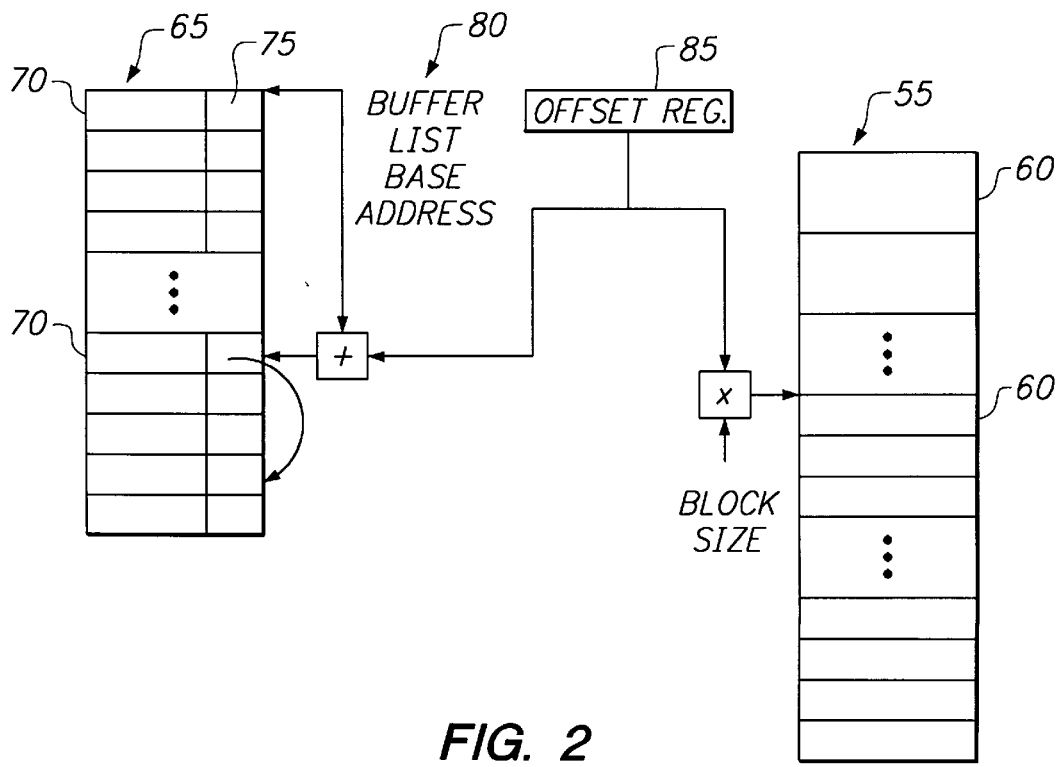
FIG. 2 shows a block diagram of a data buffer organized into data blocks, and an embodiment of a buffer list according to the present invention for accessing the data blocks.

An aspect of managing transfer of data through the data buffer system 25 includes providing a method of accessing data stored in, or to be retrieved from, the data buffer system 25. Referring to FIG. 2, the data buffer system 25 comprises a data buffer 55 organized into a plurality of data blocks 60 of the same size each for storage of data. Although in the embodiment of the invention described herein the data blocks 60 have the same size, as those skilled in the art recognize that data blocks of different sizes can also be used. The present invention provides an efficient method of accessing the data blocks 60. A buffer list 65 is utilized to keep track of the data blocks 60. The buffer list 65 includes a plurality of entries 70 each corresponding to a data block 60. The memory address of the buffer list 65 is stored in a buffer list base address register 80. To access a buffer list entry 70 and the corresponding data block 60, a partial address, common to both the buffer list entry 70 and the corresponding data block 60, is used to calculate both the address of the buffer list entry 70 and the address of the corresponding data block 60.

Figure 3:
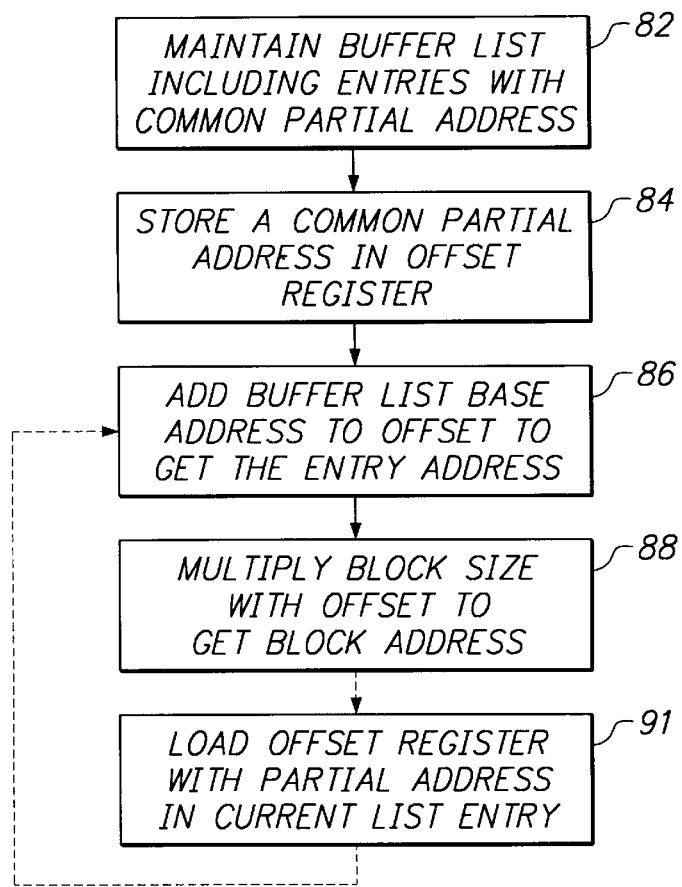
FIG. 3 shows an embodiment of a method of accessing the buffer list entries and the data blocks of FIG. 2.

Referring to FIG. 3, an embodiment of the method of the present invention comprises the steps of: (a) maintaining in each buffer list entry 70, a partial address common to both the next buffer list entry 70 and a data block 60 corresponding to said next buffer list entry 70 in step 82; (b) storing in an offset register 85, a partial address common to both a buffer list entry 70 and the corresponding data block 60 in step 84; (c) calculating the address of the buffer list entry 70 by steps including adding the partial address in the offset register 85 to the buffer list base address in the buffer list base address register 80 in step 86; and (d) calculating the address of the corresponding data block 60 by steps including multiplying the partial address in the offset register 85 with said data block size in step 88.

Since each entry 70 in the buffer list 65 includes a partial address common to both the next buffer list entry 70 and the data block 60 corresponding to that next entry 70, traversing the buffer list 65 includes: (i) storing into the offset register 85, the partial address in a buffer list entry 70 in step 91, and (ii) repeating steps 86 and 88 to obtain addresses of the next entry 70 and its corresponding data block 60.

Referring to FIG. 2, each buffer list entry 70 includes an offset field 75 for storing said common partial address. The offset register 85 is initially loaded with a partial address common to both the first buffer list entry 70 and the corresponding data block 60. Using the calculations in steps 86 and 88, the addresses of the first buffer list entry 70 and the corresponding data block 60 are determined. The first buffer list entry 70 can be called the current buffer list entry 70 for ease of explanation. To access the next buffer list entry 70 and the corresponding data block 60, the partial address in the current buffer list entry 70 is stored in the offset register 85, and the calculations in steps 86 and 88 are repeated to obtain addresses of the next entry 70 and the corresponding data block 60. The next buffer list entry 70 becomes the current entry 70, and the above steps can be repeated to traverse the entire buffer list 65. In the embodiment of the present invention described herein, the buffer list 65 is a circular linked list, such that the last buffer list entry 70 includes the partial address common to the first buffer list entry 70 and the corresponding data block 60.

In the following example embodiment, each data block 60 is 2048 bytes long, and each buffer list entry 70 is 4 bytes long. The offset register 85 is initially loaded with a partial address common to the first buffer list entry 70 and the corresponding data block 60. A Buffer List Base Address register 80 maintains the starting address of the buffer list 65.

The address of an entry 70 in the buffer list 65 is calculated as follows:

Buffer List Address=Buffer List Base Address+(4×Offset)

The address of the corresponding data block 60 is calculated as follows:

Buffer Address=Offset×block size

The addresses are used to find the first buffer list entry 70 and the corresponding data block 60. Thereafter, the Offset register 85 is loaded with content of the offset field 75 from the first buffer list entry 70. Both address calculations are repeated to find the next buffer list entry 70 and the corresponding data block 60. For example, if the data buffer 55 starts at memory address 0, and the buffer list 65 starts at memory address 65536, the Buffer List Base Address register 80 is programmed to 65536, and the Offset register 85 is programmed to 0.

To access the first entry 70 in the buffer list 65, Offset is 0:

Buffer List Address = Buffer List Base Address + (4 × Offset)

= 65536 + 4 × 0

= 65536

The corresponding data block 60 address is:

Buffer Address = Offset × block size

= 0 × 2048

= 0

The Offset register 85 is then loaded with offset field 75 from the first buffer list entry 70, which for this example, contains the value 1. To access the next entry 70 in the buffer list 65, Offset is 1:

Buffer List Address = Buffer List Base Address + (4 × Offset)

= 65536 + 4 × 1

= 65540

The corresponding data block address is:

Buffer Address = Offset × block size

= 1 × 2048

= 2048

The above steps can be repeated to traverse the entire buffer list 65.

As illustrated above, an addressing and access method according to the present invention is advantageous since it eliminates the need to store full data block addresses in the buffer list entries 70, conserving precious memory space. One internal pointer, the offset register 85, is used to point to both a buffer list entry 70 and the corresponding data in memory.

Further, adding a new entry 70 anywhere in the buffer list 65 is made simple. For example, to insert an entry 70 after an existing entry 70, the partial address in the existing entry 70 is copied into the new entry 70, and the existing entry 70 is updated with a partial address common to both the new entry 70 and its corresponding data block 60. Therefore, unlike existing methods, rearranging the buffer list 65 does not require rewrite of any portion of the buffer list 65. A detailed exemplary embodiment of this aspect of the present invention is described in the Example section below.

Figure 4:
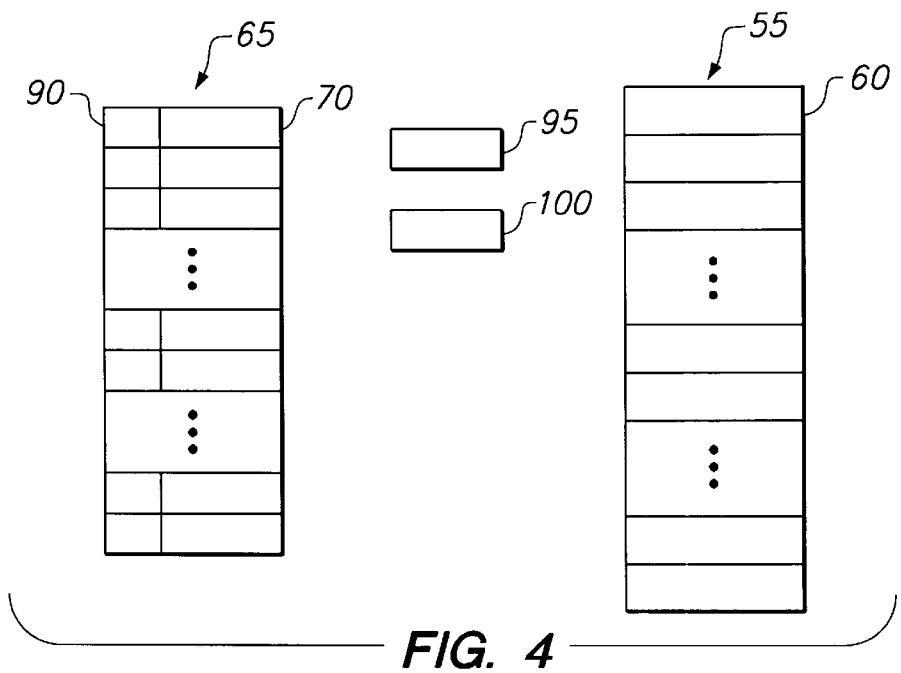
FIG. 4 shows a block diagram of a data buffer organized into data blocks, and an embodiment of a buffer list according to the present invention for coordinating storage of data into and retrieving data from the data blocks.

Another aspect of managing transfer of data through a data buffer system 25 according to the present invention, includes coordinating storing data into, and retrieving data from, the data buffer 55 by the host 15 and the disk drive 20. Referring to FIG. 4, the data buffer 55 includes a plurality of data blocks 60 each for storing data retrieved from, or to be stored in, the disk drive 20. A buffer list 65 is used to keep track of the data blocks 60. The buffer list 65 includes a plurality of entries 70 each for maintaining a status code in a status field 90 indicating the status of data in a corresponding data block 60.

The status code is selected from a cyclical set of sequential status codes having a period of N. The status codes sequentially, and alternately, represent the most recent history of a data block 60, including: (i) full status, indicating data in the data block has been retrieved from the disk drive 20 or is to be stored to the disk drive 20, or (ii) empty status, indicating data has been transferred out of the data block 60 to the host 15 or to the disk drive 20. A store flag 95 maintains a status code from said cyclical set representing empty status, and is used by tasks storing data into a data block 60, for example, by the host 15 in a write case and by the disk drive 20 in a read case. A retrieve flag 100 maintains a status code from said cyclical set representing full status, and is used by tasks retrieving data from a data block 60, for example, by the host 15 in a read case and by the disk drive 20 in a write case. The retrieve flag 100 status code immediately follows or immediately precedes the store flag 95 status code in the cyclical set.

Figure 5:
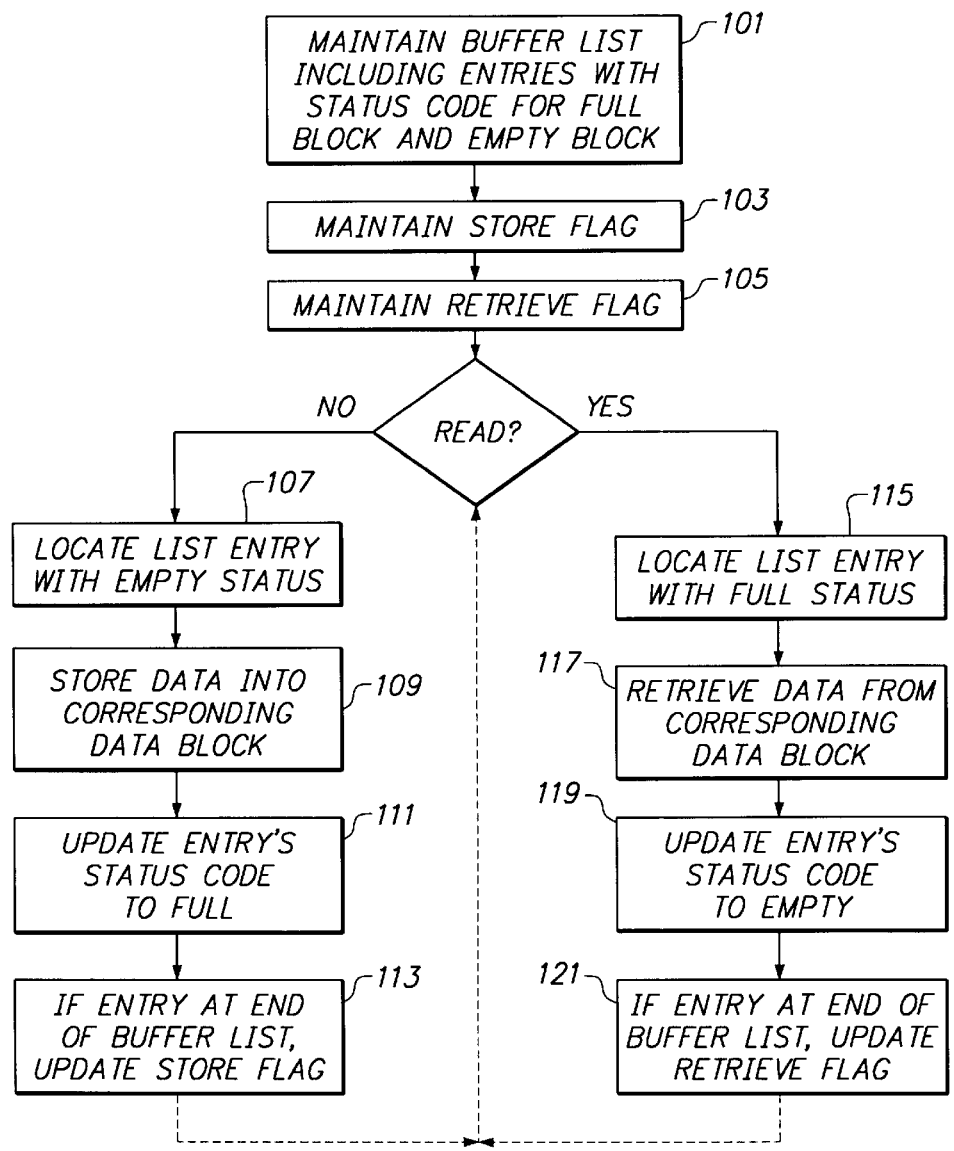
FIG. 5 shows an embodiment of a method of coordinating storing data into and retrieving data from the data blocks in FIG. 4.

Referring to FIG. 5, the buffer list 65 and the flags 95, 100 are maintained in steps 101, 103 and 105, respectively, to coordinate the interaction between a host task transferring data to and from the host 15, and a disk task transferring data to and from the disk drive 20. Initially, each buffer list entry 70 is set to empty status. Thereafter, storing data into the data buffer 55 comprises the steps of: (i) locating in the buffer list 65 a desired entry 70 in step 107; (ii) storing data into the corresponding data block 60 when the status code of the entry 70 matches the store flag 95 status code, representing a corresponding empty data block 60 in step 109; (iii) updating the entry 70 with a status code from said cyclical set next in sequence to the store flag 95 status code, indicating the data block 60 is full in step 111; and (iv) if the entry 70 is at the end of the buffer list 65, updating the store flag 95 to a status code immediately following the next consecutive status code in said cyclical set in step 113. This step is equivalent to sequentially advancing the current store flag 95 status code in the cyclical set twice.

In this embodiment, the desired entry 70 is initially determined by the firmware. For example, the firmware may set aside a particular segment of the data buffer for a particular operation. It may also decide to start at the beginning of that segment. Then, the first entry would be at an offset corresponding to the start of the beginning of that segment. Thereafter, subsequent entries can be sequential to the desired entry as the transfer operation into or out of the data buffer proceeds.

Retrieving data from the data buffer 55 comprises the steps of: (i) locating in the buffer list 65 a desired entry 70 in step 115; (ii) retrieving data from the corresponding data block 60 when the status code of the entry 70 matches the retrieve flag 100 status code, representing a corresponding full data block 60 in step 117; (iii) updating the entry 70 with a status code from said cyclical set next in sequence to the retrieve flag 100 status code, indicating the data block 60 is empty in step 119; and (iv) if the entry 70 is at the end of the buffer list 65, updating the retrieve flag 100 to a status code immediately following the next consecutive status code in said cyclical set in step 121. This step is equivalent to sequentially advancing the current retrieve flag 100 status code in the cyclical set twice.

In an embodiment of the invention, the cyclical set of status codes comprises 0, 1, ..., N–1, with a period of N. In this case, the status field 90 in each buffer list entry 70, the store flag 95 and the retrieve flag 100, each comprise a binary field of at least 2 bits. Steps 111, 119 above in storing and in retrieving data includes incrementing the contents of the binary buffer list entry 70 by one. And, steps 113, 121 above in storing and in retrieving data includes incrementing the contents of the binary store flag 95 and the binary retrieve flag 100 by two, respectively.

For simplicity, in the following example, N is selected to be 4. The status codes comprise 0, 1, 2, and 3, with the status codes 1 and 3 representing full status, and the status codes 0 and 2 representing empty status. The status codes can be implemented as 2 bit binary numbers in a 2-bit binary field. A 2-bit binary field incremented by 1 cycles through 00, 01, 10, 11 and then back to 00. Therefore, the status field 90 in each buffer list entry 70 comprises a 2-bit binary field. Similarly, each of the store and retrieve flags 95, 100 comprises a 2-bit binary field.

In this example, the host 15 requests 10 sectors to be read from the disk. The data buffer 55 includes four data blocks 60 and the buffer list 65 includes four entries 70. Both the host 15 and the disk drive 20 start with the first entry 70 in the buffer list 65 and traverse the buffer list 65 according to the steps described above. Each buffer list entry 70 is initialized to status code 0. For simplicity, in the following description, the status codes for the buffer list entries 70 are shown as "buffer list entries", and incrementing a buffer list entry means that the status code binary filed in the buffer list entry is incremented. The store flag 95 is initialized to status code 0, and the retrieve flag 100 is initialized to the status code 1:

buffer list entries: 0000 store flag: 0 retrieve flag: 1

The disk drive 20 reads two sectors from the disk and stores them in the first two data blocks 60 with status code 0, matching the store flag 95 status code 0, and increments their buffer list entries by 1:

buffer list entries: 1100 store flag: 0 retrieve flag: 1

The host 15 retrieves one sector from the first data block 60 with status code 1, matching the retrieve flag 100 status code 1, and increments the buffer list entry by 1:

buffer list entries: 2100 store flag: 0 retrieve flag: 1

The disk drive 20 reads two more sectors from the disk and stores them in the last two data blocks 60 with status code 0, matching the store flag 95 status code 0, and increments their buffer list entries by 1:

buffer list entries: 2111 store flag: 0 retrieve flag: 1

At this point, the disk drive 20 is at the end of the buffer list 65, and automatically rolls over to the beginning of the list, incrementing the contents of the store flag 95 by 2:

buffer list entries: 2111 store flag: 2 retrieve flag: 1

The first data block 60 has already been retrieved by the host 15, showing a status code of 2, representing empty status. Therefore, the disk drive 20 can read another sector from the disk and store it in the first data block 60. The disk drive 20 reads another sector and stores it in the first data block 60 with status code 2, matching the store flag 95 status code 2, and increments its buffer list entry by 1:

buffer list entries: 3111 store flag: 2 retrieve flag: 1

The host 15 retrieves another sector from the first data block 60 with status code 1, matching the retrieve flag 100 status code 1, and increments its buffer list entry by 1:

buffer list entries: 3211 store flag: 2 retrieve flag: 1

The disk drive 20 reads another sector from the disk and stores it in the first data block 60 with status code 2, matching the store flag 95 status code 2, and increments its buffer list entry by 1:

buffer list entries: 3311 store flag: 2 retrieve flag: 1

The host 15 retrieves two more sectors from data blocks 60 with status code 1, matching the retrieve flag 100 status code 1, and increments their buffer list entries by 1:

buffer list entries: 3322 store flag: 2 retrieve flag: 1

At this point, the host 15 is at the end of the buffer list 65, and automatically rolls over to the beginning of the list, incrementing the contents of the retrieve flag 100 by 2:

buffer list entries: 3322 store flag: 2 retrieve flag: 3

The host 15 then retrieves two sectors from data blocks 60 with status code 3, matching the retrieve flag 100 status code 2, and increments their buffer list entries by 1:

buffer list entries: 0022 store flag: 2 retrieve flag: 3

The disk drive 20 then stores two sectors into data blocks 60 with status code 2, matching the store flag 95 status code 2, and increments their buffer list entries by 1:

buffer list entries: 0033 store flag: 2 retrieve flag: 3

At this point, the disk drive 20 is again at the end of the buffer list 65, and automatically rolls over to the beginning of the list, incrementing the contents of the store flag 95 by 2:

buffer list entries: 0033 store flag: 0 retrieve flag: 3

The host 15 retrieves two sectors from data blocks 60 with status code 3, matching the retrieve status code 3, and increments their buffer list entries by 1:

buffer list entries: 0000 store flag: 0 retrieve flag: 3

At this point, the host 15 is again at the end of the buffer list 65, and automatically rolls over to the beginning of the list, incrementing the contents of the retrieve flag 100 by 2:

buffer list entries: 0000 store flag: 0 retrieve flag: 1

The disk drive 20 reads two more sectors from the disk into data blocks 60 with status code 0, matching store flag 95 status code 0, and increments their buffer list entries by 1:

buffer list entries: 1100 store flag: 0 retrieve flag: 1

The host 15 retrieves two sectors from data blocks 60 with status code 1, matching the retrieve flag 100 status code 1, and increments their buffer list entries by 1:

buffer list entries: 2200 store flag: 0 retrieve flag: 1

At this point, the 10 sector read request is satisfied since all 10 sectors were stored in the data buffer 55 by the disk drive 20 and retrieved by the host 15.

As illustrated by the above example, the status codes are continuously recycled, and the process can be automated for execution by a dedicated logic circuit, eliminating the need for a microprocessor to monitor a status change and notify the host 15 or the disk drive 20 of that status change. The host and disk drive tasks coordinate their operations using the status codes. For example, a host task in a write case, or a disk task in a read case, waits until the status code of a selected entry 70 matches the store flag status 95 code indicating the task can transfer data into the corresponding data block 60. Similarly, a host task in a read case, or a disk task in a write case, waits until the status code of a selected entry matches the retrieve flag 100 status code indicating the task can transfer data out of the corresponding data block 60.

The value for N has a minimum value equal to the number of kinds of operations +1, and has no maximum value. In the above example, the minimum value of N would be 3, as two operations, store and retrieve, are described. Preferably, the value for N is selected to be 4 because the status codes 0, 1, 2, and 3 can be represented by 2 bits, conserving memory. Further, the above status codes enable non-sequential access to the buffer list 65 and the data blocks 60 by the disk drive 20. For example, in servicing a multi-sector write request from the host 15, the disk drive 20 may retrieve data from a data block 60 in the data buffer 55, continue retrieving data from consecutive data blocks 60, then go off-track for a while, and then get back on track and access the data buffer 55 to retrieve data from a few more data blocks 60. However, in doing so, the disk drive 20 may or may not start in the buffer list 65 where it left off. As such, without proper precautions, non-sequential retrieval of data from data blocks 60 can cause data intended for a particular disk sector to be written to a different unintended sector.

To prevent this result in the write example above, the disk drive 20 must make a distinction between (1) a data block 60 in the data buffer 55 that has been filled by the host 15, written to the disk, and re-filled by host 15, and (2) a data block 60 that has merely been filled by the host 15 once. As illustrated by the following example, the present invention provides the disk drive 20 with information needed to make such a distinction.

As in the previous example, the data buffer 55 includes four data blocks 60 and the buffer list 65 includes four entries 70. The current disk track includes three sectors. The host 15 issues a five sector write for disk sectors 1–5:

buffer list entries: 0000 store flag: 0 retrieve flag: 1

The host 15 stores data for sectors #1, #2, #3 and #4 in the first four data blocks 60, and increments their buffer list entries by 1:

buffer list entries: 1111 store flag: 0 retrieve flag: 1

The host 15 is now at the end of the buffer list 65, so it increments the store flag 95 by 2:

buffer list entries: 1111 store flag: 2 retrieve flag: 1

The host 15 cannot store any more data into the data buffer 55 since all the data blocks 60 are full. The disk drive 20 retrieves sectors #1 and #2 from the first two data blocks 60 and stores them on the disk. It increments the buffer list entries of the first two data blocks 60 by 1. The first two data blocks 60 are empty, and the last two data blocks 60 contain sectors #3 and #4, respectively:

buffer list entries: 2211 store flag: 2 retrieve flag: 1

The disk drive 20 goes off-track, and does not transfer any data. The host 15 stores sector #5 in the first data block 60 and increments its buffer list entry by 1. The first data block 60 contains sector #5, and the last two data blocks 60 contain sectors #3 and #4, respectively:

buffer list entries: 3211 store flag: 2 retrieve flag: 1

The disk drive 20 takes one sector to get back on-track. It starts again, resetting the retrieve flag 100 to 1, and goes to the beginning of the buffer list 65. Except for status code 3 in the buffer list entry for the first data block 60, there is not any other information in the disk drive channel to inform the disk drive 20 that the host 15 has stored sector #5 in the first data block 60. Since status code 3 does not match the retrieve flag 100 status code 1, the disk drive 20 does not retrieve data from the first data block 60. Indeed, the first data block 60 contains sector #5. Status code 1 for the last two data blocks 60 match the retrieve flag 100 status code, notifying the disk drive 20 to retrieve data from the last two data blocks 60.

Therefore, the disk drive 20 has successfully differentiated between the first data block 60 that has been filled by the host 15, written to disk by the disk drive 20, and re-filled by the host 15, and the last two data blocks 60 which have merely been filled by the host 15 once. The status codes 1 and 3 allow the disk drive 20 to differentiate between those two situations. In the current example, if these two cases were the same, then sector #1 on the disk would be written twice once with sector #1 data, and once with sector #5 data. An unacceptable result.

Continuing with the example, the disk drive 20 retrieves sectors #3 and #4 from the last two data blocks 60 and stores them to disk, incrementing buffer list entries of the last two blocks 60 by 1:

buffer list entries: 3222 store flag: 2 retrieve flag: 1

Since the disk drive 20 is at the end of the buffer list 65, it increments the retrieve flag 100 by 2 and rolls over to the beginning of the buffer list 65:

buffer list entries: 3222 store flag: 2 retrieve flag: 3

As the first data block 60 has status code 3, matching the retrieve flag 100 status code 3, the disk drive 20 retrieves sector #5 from the first data block 60 and writes it to the disk, satisfying the host write request:

buffer list entries: 0222 store flag: 2 retrieve flag: 3

As illustrated by the above example, although the disk drive 20 did not access the buffer list 65, and the data blocks 60, sequentially, the present invention allowed the disk drive 20 to sequentially retrieve sectors #1, #2, #3, #4 and #5 from the data 55 and sequentially write them to the proper sectors on the disk.

According to another aspect of the present invention, each buffer list entry 70 can include both: (i) a status code for indicating the status of data in the corresponding data block 60, and (ii) a partial address common to both the next buffer list entry 70 and a data block 60 corresponding to said next buffer list entry 70, as described above. In this case, when storing data into the data buffer 55, the step of locating a desired entry 70 in the buffer list 65 with an empty status code includes traversing the buffer list 65 as described above, until the desired entry 70 is found. The address of the data block 60 corresponding to the found entry 70 is then calculated as described above and data is stored in the data block 60 when the status code of the entry 70 matches the retrieve store status code. The store flag 95 and the entry 70 are then updated as described above. Similarly, when retrieving data from the data buffer 55, the step of locating a desired entry 70 in the buffer list 65 includes traversing the buffer list 65 as described above, until the desired entry 70 is found. The address of the data block 60 corresponding to the found entry 70 is calculated and data is retrieved from the data block 60 when the status code of the entry matches the retrieve flag status code. The retrieve flag 100 and the entry 70 are then updated as described above.

The present invention can be implemented as program instructions to be performed by a processor or to configure a logic circuit. The program instructions can be implemented in a high level programming language such as C, Pascal, etc. which is then compiled into object code and linked with object libraries as necessary to generate executable code for the processor. The program instructions can also be implemented in assembly language which is then assembled into object code and linked with object libraries as necessary to generate executable code.

Preferably, a controller logic circuit 150 is configured by the program instructions to perform the steps described above. The logic circuit 150 can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods.

A dedicated logic circuit, such as an ASIC, provides higher performance than a microprocessor since the logic is implemented directly in the chip rather than using an instruction set requiring multiple clock cycles to be executed by a microprocessor. Further, the microprocessor typically executes several different tasks which can delay prompt updating of the flags for increased throughput. By automating store and retrieve coordination, several operations, not possible with a purely microprocessor driven approach, are possible. Such operations include out-of-order transfers from the disk (Zero Rotational Latency) and storing data in the data buffer 55 in complex out of order schemes, such as advanced buffer allocation. The coordination method of the present invention removes the microprocessor from any real-time control of the communication between the host 15 and the disk drive 20 through use of the data buffer 55.

Figure 6:
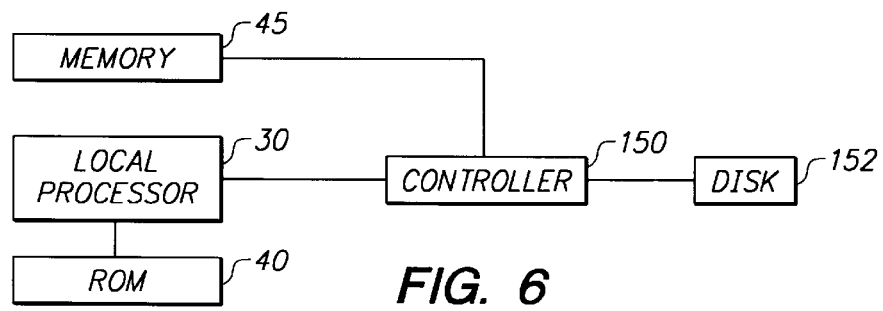
FIG. 6 shows a simplified circuit diagram of an example disk drive circuit including a controller logic circuit in which the present invention can be implemented.

Referring to FIG. 6, the controller logic circuit 150 can be interconnected to a memory device 45, a microprocessor 30 with ROM 40, and a disk drive controller 152. Typically, the ROM 40 includes data and program instructions for the microprocessor 30 to interact with a spindle motor controller and a voice coil motor controller in the disk drive 20, and to oversee transfer of data between a host 15 and the disk drive 20 through the memory device 45. The memory device 45 includes the data buffer 55 for storing data into and retrieving data from the disk drive 20. The memory device 45 can also be used to store and maintain the buffer list 65.

Other means, comprising memory devices, processors, logic circuits, and/or analog circuits, for performing the above steps are possible and contemplated by the present invention. For example, a dedicated microprocessor, with an instruction set customized for these operations may be used. The circuit may be embedded in the memory device. Additionally, the levels of the store and retrieve flags may be done in an analog manner. Therefore, a controller according to the present invention should not be limited to the descriptions of the versions described herein.

EXAMPLE

Referring to FIGS. 7–10, an example embodiment of the present invention, a Buffer List Manager (BLM), is described. The Buffer List Manager manages data flow through the data Buffer by a Host and a Disk Drive, using the Buffer List. The following definitions are used in this example:

| | |
|---|---|
| Buffer | An area in memory (DRAM), organized into 2048 byte data blocks for storing data in this example; |
| Puppy | A data block in the Buffer, organized int four 512 byte data sectors in this example; |
| Sector Offset | The distance into a Puppy expressed in sectors, 2-bits, ranging from 0 to 3 in this example, 2-bits; |
| Buffer List | A linked list in DRAM used to organize the Buffer; |
| Buffer List Entry | A single entry or element in the Buffer List corresponding to a Puppy; |
| Buffer List Base | A 20-bit DRAM address for the first Buffer List Entry; |
| Offset | An 11-bit partial address common to both the next Buffer List Entry and the Puppy corresponding to the next Buffer List Entry. Offset is used to traverse the Buffer List and to calculate the Sector starting address in the Buffer; |
| Next Offset | A specific instance of Offset stored in a Buffer List Entry to calculate the address of the next Buffer List Entry and corresponding Puppy; |
| Scan | A logic circuit function for traversing the Buffer List to arrive at a desired start location in the Buffer for data transfer |
| Buffer List Address | Address of a Buffer List Entry; |
| Buffer Address | Address of a start location in the Buffer for data transfer; |

-continued

| | |
|---|---|
| DIB | Data Integrity Block check code in DRAM in each sector; |
| Opcode | 2-bit status code filled in each Buffer List Entry. |

Figures 7, 8:
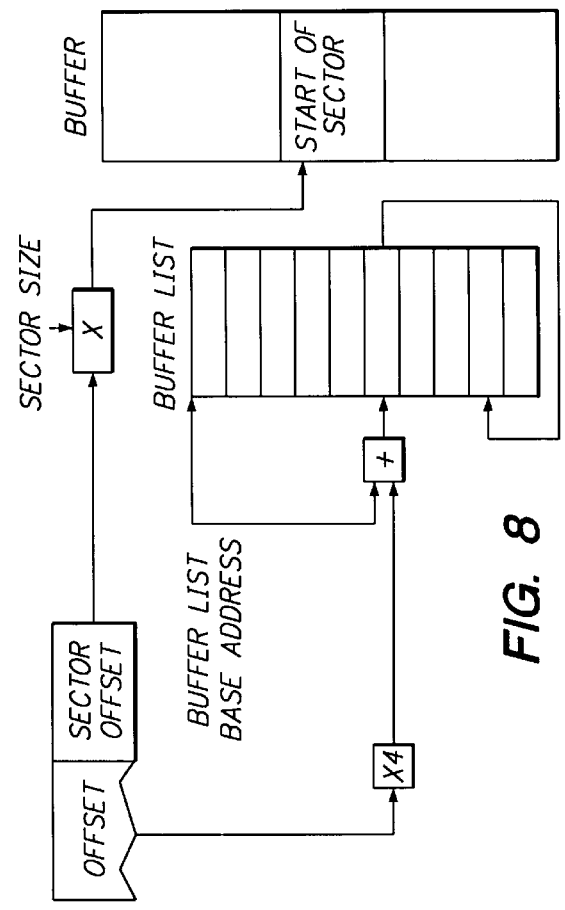
FIG. 7 shows an example buffer list entry according to the present invention.
FIG. 8 shows a block diagram of an example data buffer organized into data blocks and an example buffer list including the entries of FIG. 7.

Referring to FIG. 7, the Buffer List includes a plurality of entries 70 each two words (4 bytes) long. Each Buffer List Entry contains an 11-bit next link pointer (Next Offset), four 2-bit status codes (Opcodes), a 2-bit Expected Opcode Delta field for storing the value for incrementing a store or a retrieve flag 100, and control bits (last sector, Opcode offset, interrupts, etc.). The status codes comprise 0, 1, 2, and 3, with status codes 0 and 2 representing an empty data block (sector), and status codes 1 and 3 representing a full sector. The Buffer List and the data Buffer can reside anywhere in memory. There are no restrictions on how the Buffer List is linked (non-sequential). Each Buffer List Entry and corresponding Puppy have a common partial address mapping between them as described above. In the following, exemplary address calculations based on the mapping, and access control are described.

Address Calculation

An internal Offset Register is initially loaded with a partial address ("Offset") common to both the first Buffer List Entry, and the corresponding Puppy. The Buffer List Address for the first Buffer List Entry, and Buffer Address for the corresponding Puppy are calculated as follows:

Buffer List Address=Buffer List Base Address+(4×Offset)

Buffer Address=(4×Offset+Sector Offset)×(Sector Size+DIB)

The addresses are used to find the first Buffer List Entry and the corresponding Puppy in memory. Thereafter, the internal Offset Register is loaded with "Next Offset" from the current Buffer List Entry. Both address calculations are repeated to find the next Buffer List Entry and the corresponding Puppy. The address calculations are illustrated by a few numeric example cases below.

Case 1

In this case, the Buffer starts at address 0 in memory, and the Buffer List starts at address 65536. The value of (Sector Size+DIB) is selected to be 512. The Buffer List Base Address is programmed to 65536. To access entry 0 in the Buffer List the Offset is 0, to access entry 1 the Offset is 1, etc.

To access the first entry in the Buffer List, Offset is 0:

| | |
|---|---|
| Buffer List Address | = Buffer List Base Address+ (4×Offset) |
| | = 65536+4×0 |
| | = 65536 |
| The corresponding | |
| data block address is: | |
| Buffer Address | = (4×Offset + Sector Offset)× |
| | (Sector Size + DIB) |
| Buffer Address | = (4×0 + 0)×(512) |
| | = 0×512 |
| | = 0 |

The Offset Register is then loaded with Offset from the first Buffer List Entry, which for this example, contains the value 1. To access the next in the Buffer List, Offset is 1:

| | |
|---|---|
| Buffer List Address | = Buffer List Base Address+ (4×Offset) |
| | = 65536+4×1 |
| | = 65540 |
| The corresponding | |
| data block address is: | |
| Buffer Address | = (4×Offset + Sector Offset)× |
| | (Sector Size + DIB) |
| Buffer Address | = (4×1 + 0)×(512) |
| | = 4×512 |
| | = 2048 |

Figure 9:
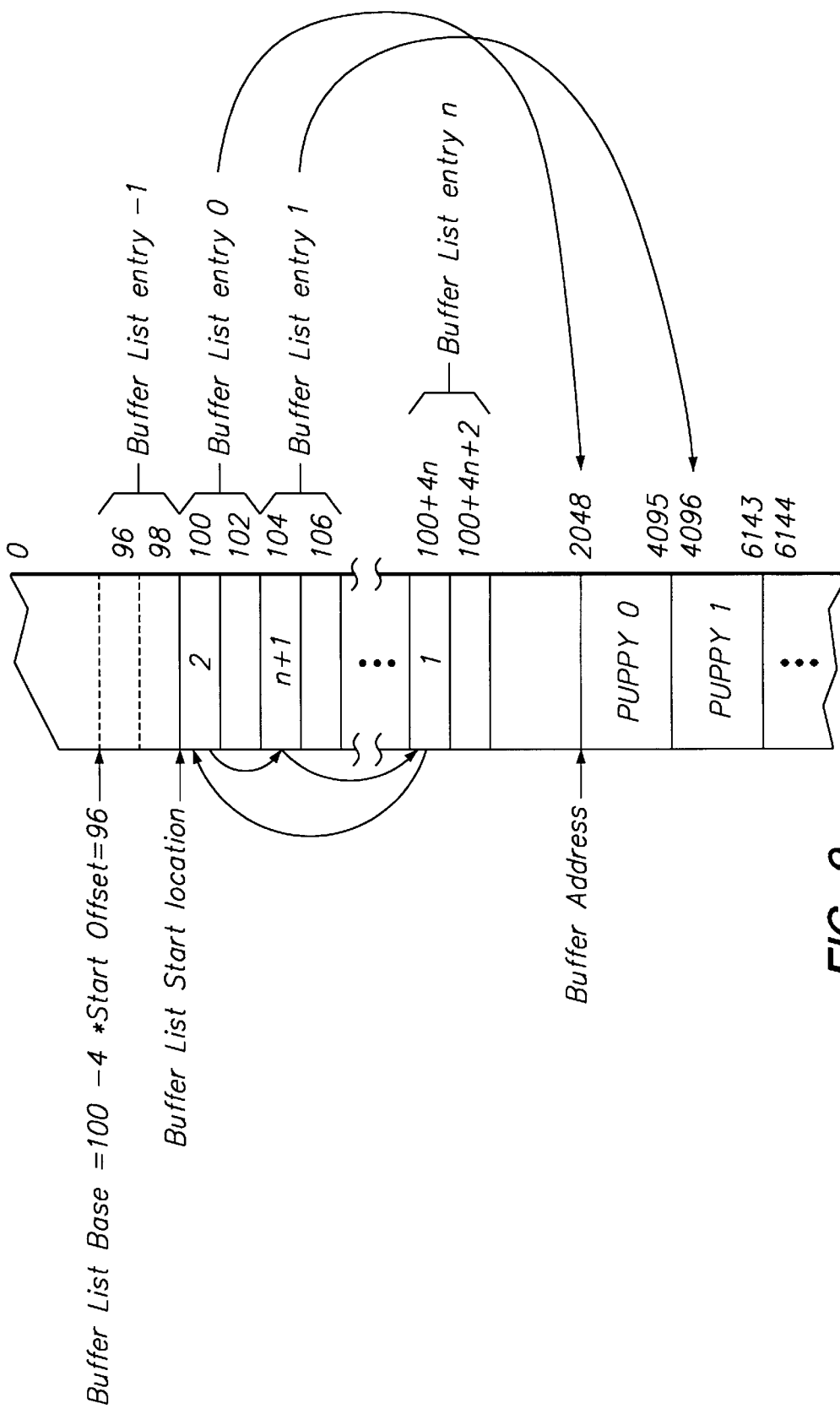
FIG. 9 shows a block diagram of another example data buffer organized into data blocks and another example buffer list including the entries of FIG. 7.

Referring to FIG. 8, to start the Buffer at a higher address, the starting value of the offsets are increased and the Buffer List Base Address is programmed with (Buffer List Base Address−2×start offset). This provides a virtual section of the Buffer List that is not accessed. Referring to FIG. 9, to start the Buffer at address 2048 and the Buffer List at address 100 in memory, the start offset for Buffer List Entry zero is 1, and the offset for Buffer List Entry one is 2. The Buffer List Base Address is programmed with 100−4×Start Offset= 96.

The memory address for several Buffer List Entries 70 and corresponding Puppies are:

Buffer List Address=Buffer List Base Address+4×Offset

Entry 0: 96+4×1=100

Entry 1: 96+4×2=104

Buffer Address=(4×Offset+Sector Offset)×(Sector Size+DIB)

Puppy 0, Sector 0: (4×1+0)×512=2048

Puppy 0, Sector 1: (4×1+1)×512=2060

Puppy 1, Sector 0: (4×2+0)×512=4096

Puppy 1, Sector 1: (4×2+1)×512=4608

Though the Offsets are sequential, a read or write operation may not use sequential entries. For example, after offset 0 is used, the offset in the entry for the next entry may be 10, so offset 10 is used next for address calculations. For example, in FIG. 8, the arrows on the left of the Buffer List show the flow of one read or write operation. Shown inside each entry is the Next Offset, indicating where the next entry is. The entries are linked from 1 to 2 to n+1 and back to 1 again. Thus, the first entry (called Buffer List entry 0) is at offset 1, the second entry (Buffer List entry 1) is at offset 2, and the third entry (Buffer List entry n) is at offset n+1. The third entry loops back to Buffer List entry at offset 1. The arrows on the right show the relationship between each Buffer List entry and the corresponding Puppy in the Buffer.

Case 2

In this case, the Buffer starts at memory address 0, and the Buffer List starts at memory address 30000. The Buffer List Base Address is programmed to 30000. In this example Sector size is 512 bytes and a DIB is 2 bytes long.

The first Buffer List Entry is at Offset 0:

$$\begin{aligned}
\text{Buffer List Address} &= \text{Buffer List Base Address} + 4 \times \text{Offset} \\
&= 30000 + 4 \times 0 \\
&= 30000
\end{aligned}$$

The first Sector at Offset 0 has a Sector Offset of zero in the Puppy corresponding to the first Buffer List Entry. Therefore, for the first Sector in the Puppy:

$$\begin{aligned}
\text{Buffer Address} &= (4 \times \text{Offset} + \text{Sector Offset}) \times \\
&\quad (\text{Sector Size} + DIB) \\
&= (4 \times 0 + 0) \times (514) \\
&= 0
\end{aligned}$$

The second Sector in the Puppy is at Sector Offset 1:
Buffer Address=(4×0+1)×514=514
The third Sector in the Puppy is at Buffer Address 1028, and the fourth and last Sector in the Puppy is at Buffer Address 1542.

Since each Offset corresponds to a Puppy with four sectors, the third Sector at Offset 10, is the forty-third Sector in the Buffer:
Buffer List Address=30000+4×10=30040
Buffer Address=(4×10+2)*(514)=42*514=21588

Case 3

In this case, the Buffer starts at memory address 24672 and the Buffer List starts at memory location 10000. The address 24672 is twelve Puppies, or forty-eight Sectors, deep in memory (12×4×514). The start of the Buffer must be on an even 514×4 boundary. There is no offset in the Buffer Address. Since the Buffer List starts at address 10000, the Buffer List Entry at address 10000 has an Offset of 12.

Therefore, the Buffer List Base Address must be programmed so that address 10000 is at Offset 12:

$$\begin{aligned}
\text{Buffer List Address} &= \text{Buffer List Base Address} + 4 \times \text{Offset} \\
&= \text{Buffer List Base Address} + 4 \times 12 \\
&= 10000 \\
\text{Buffer List Base Address} &= 10000 - (4 \times 12) = 9952
\end{aligned}$$

Therefore, the Buffer List Base address is programmed to 9952. As such, for Offset 12, Sector Offset 0:

$$\begin{aligned}
\text{Buffer List Address} &= \text{Buffer List Base Address} + 4 \times \text{Offset} \\
&= 9952 + (4 \times 12) \\
&= 10000 \\
\text{Buffer Address} &= (4 \times \text{Offset} + \text{Sector Offset}) \times \\
&\quad (\text{Sector Size} + DIB) \\
&= (4 \times 12 + 0) * (514) \\
&= 24672
\end{aligned}$$

Coordination between the Host and the Disk Drive

The example Buffer List Manager coordinates a Disk Drive task with a host SCSI interface task for transferring data to and from the Host. To operate the Buffer List Manager, an initial Buffer List is built as part of a power on initialization procedure, and the following registers/pointers are programmed by the procedure:

Buffer List Base
Disk Start
Disk Fetch
Disk Update
Host Look Ahead
Host Fetch
Host Update Interaction between the Disk Drive and the BLM A formatter (FMTR) or sequencer controls the Disk Drive read/write channel. At a byte level, the FMTR controls the timing of when a write starts, when a read starts, etc. The FMTR decides if the next sector can be transferred. The FMTR to BLM interface includes two types of exchanges: a fetch and an update. The FMTR issues a fetch request for the next sector to be transferred. The BLM then reads the relevant Buffer List Entry for the Opcode controlling that sector, and compares it with the retrieve flag (expected Opcode) for the Disk Drive. The BLM then acknowledges the request along with an Opcode OK if case of a match. The FMTR either transfers or skips the sector based on the Opcode match. After each fetch request, the BLM advances the Disk Fetch pointer.

If the FMTR transfers the sector, it issues an update pointer. The BLM advances or increments the Opcode, writes the Opcode back to the Buffer List Entry, and advances the Disk Update pointer. If the FMTR does not transfer the sector, it issues an advance pointer and the BLM advances the Disk Update pointer without modifying the Opcode. When the Disk Drive has reached the end of the Logical Sector Address (LSA) range programmed in the FMTR, the FMTR sends a fetch rollover signal or an update rollover signal. The BLM reloads the Disk Fetch register or the Disk Update register with the Disk Start register.

Interaction between the Host and the BLM

The Host to BLM interface includes 3 types of exchanges: a look ahead, a fetch, and an update. When the Host channel has been initialized and the Host has issued a start signal, the BLM starts a look ahead process to count available sectors. When the number of available sectors crosses a threshold, the Host starts transferring data. The Host also sends a fetch request for the next sector's start address and Opcode. If the next sector is in a new Puppy, the BLM reads the next Buffer List Entry. The BLM also calculates the Buffer Address for the sector and passes the information to a Buffer Controller for transferring data to that address. When the calculations are completed, the BLM advances the Host Fetch pointer. After a sector transfer is complete, the Host issues a sector done signal. The BLM advances the Host Update pointer and increments the Opcode for that sector. If it is the last sector in the Puppy, the BLM also writes back the updated Opcodes for that Puppy into the Buffer List Entry in memory. If a fetch or update is not pending, the BLM looks ahead for available sectors. As long as the count of available sectors remains above the threshold, or equals the number of sectors remaining, the Host continues to transfer.

Read Example

In this example, the Host issues a disk read of LSAs 200–210. Disk track sector 0 corresponds to LSA 0. The Buffer List Base Address register, the Disk Start register, the Disk Fetch register, the Disk Update register, the Host Look Ahead register, the Host Fetch Register and the Host Update register are initialized. The 2 least significant bits of the Sector Offset, in this case 00, are used as a sector offset number into the Puppy. The Host and Disk Drive start bits are set. When required, the BLM calculates the sector start address from fetch offset values, and sends the address to the Buffer Controller. The BLM automatically follows the thread of the Next Offset in the Buffer List as required.

When the Disk Drive servo arrives on track, the FMTR starts its fast forward mode handshaking with the BLM. In this example, the disk lands on sector 205. The FMTR also issues advance strobes to the BLM, and the BLM advances the update pointer without updating the Opcodes. The FMTR starts transferring data for sector 206 and fetches the address for sector 207. Sector 206 completes and the FMTR issues an update strobe. The BLM updates the Opcode for sector 206 and advances the update pointer. The FMTR transfers data for sector 207 and fetches the address for sector 208. The BLM accesses the Buffer for the next Puppy for sector 208. Sector 207 completes and the BLM updates the Opcode for sector 207 and advances the Update pointer. This being the last sector for the Puppy, the BLM writes the updated Opcodes back into the Buffer List Entry. The same steps are performed for sectors 208, 209 and 210. After the FMTR has received the fetch for the last LSA, it issues a rollover signal for fetches. The BLM rolls its Current fetch pointer and its Current update pointer to a Disk start value, corresponding to LSA 200 in this case. When the disk comes around to sector 200, the FMTR transfer LSAs 200–205 and stops.

The Host requests fetches for sector 200, and then for sectors 201, 202, . . . until it passes its threshold. Thereafter, the Host connects to the SCSI bus and starts data transfer for the current sectors, fetches the address and Opcode for the next sector and continues looking ahead for available sectors. When a sector has transferred across the SCSI bus, the Host interface issues an update pointer and the BLM increments the Opcode and advances the Host update pointer. For this example, the Disk Drive is done before the Host, and all 11 sectors are transferred in a single burst.

Write Example

In this example, the Host issues a disk write instruction for 10 sectors from LSA 101 to 110. The disk track sector 0 corresponds to LSA 0. The Buffer List Base Address register, the Host look ahead register, the Host Fetch register, and the Host Update register are initialized. The 2 least significant bits if the Sector Offset, in this case 01, are used as offset number for the second sector into the Puppy. The BLM calculates the Buffer Address for sector 101 and passes the address to the Buffer Controller. When the Buffer Controller latches that address into its host pointer and sends a host next pointer strobe. Upon receiving the signal, the BLM increments the fetch pointer, and calculates the Buffer Address for sector 102. The BLM looks ahead for available sectors. All sectors in the first Puppy are available so that the threshold counter contains 3. Look ahead cycles are performed for the next two Puppies, sectors 104–107, and sectors 108–110. The threshold counter is incremented to 10 (3+4+3). When the count passes the threshold, the Host starts data transfer to the Buffer.

The Host transfers sectors 101–103 and starts the FMTR. The Host transfers sectors 104–105 while the FMTR fast forwards and synchronizes with the Disk Drive on sector 105. Th Host transfers sectors 106–110 while the FMTR transfers sectors 105–107. The Host completes its transfer. The FMTR transfers sectors 108–110 and issues a fetch and update rollover. The BLM resets its Disk Fetch pointer and Disk Update pointer to the link address for sector 101. The FMTR and the BLM remain idle until the disk rotates around to sector 101, then sectors 101–104 are transferred and the instruction is completed.

Write Hold-Off

An additional feature of the present invention includes keeping data written to the disk in memory, and holding off the Host from overwriting the data in memory, until the Disk Drive servo signals that the data was properly written to the disk and can be discarded from memory. As soon the Disk Drive stores a data block or sector from memory to disk, the Host is held-off from overwriting that data block. The servo keeps information about disk tracks on wedges on the disk. As each wedge goes by, the information on the wedge is examined to determine if data was properly written to the portion of the track corresponding to the wedge. If so, the Host can overwrite that portion of data block in memory corresponding to said portion of the track.

BLM Logic Circuit

Figure 10:
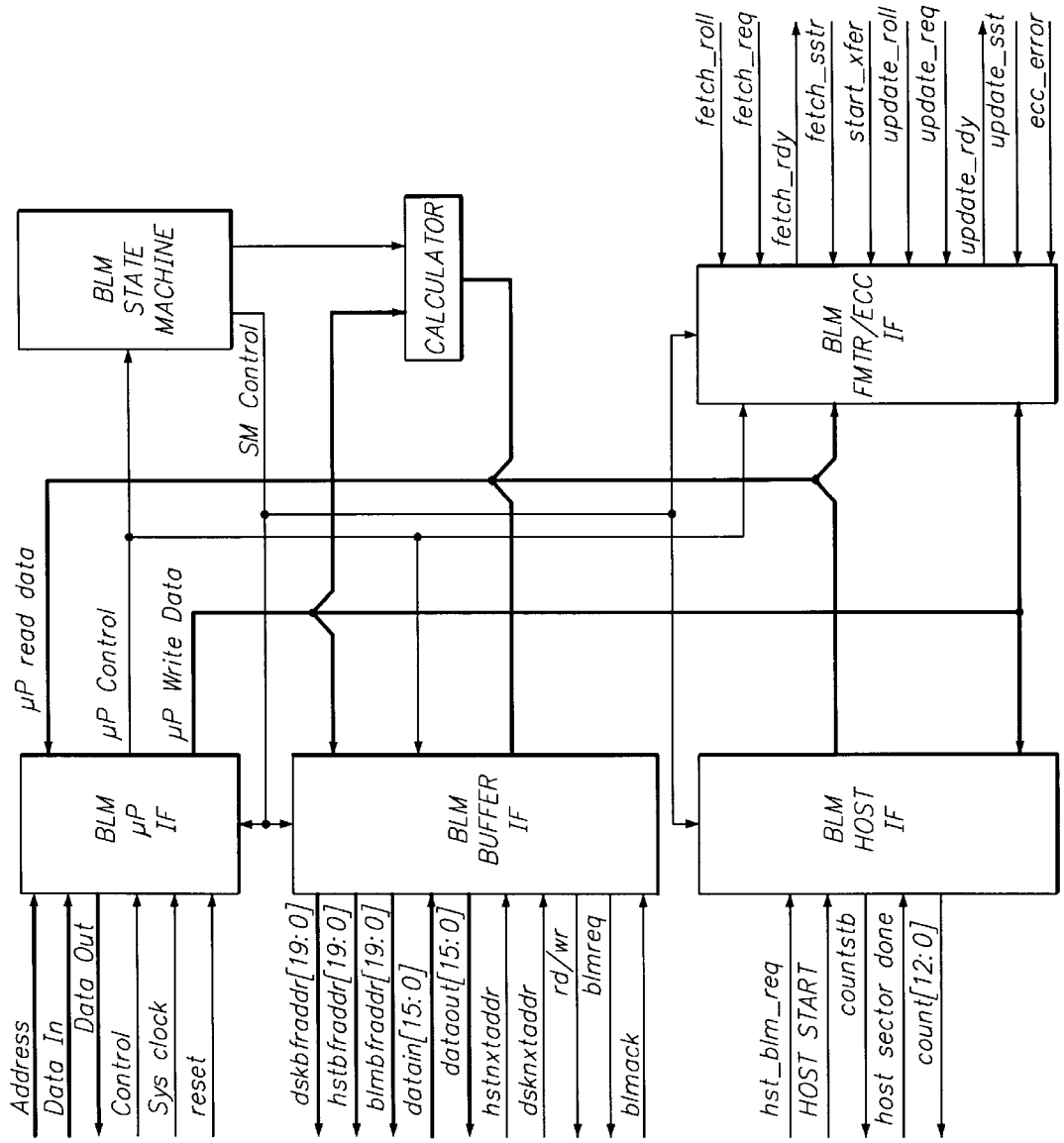
FIG. 10 shows a simplified block diagram of an example embodiment of the controller logic circuit of FIG. 6.

The BLM is preferably implemented in a logic circuit as described above. FIG. 10 shows a block diagram of an embodiment of a BLM logic circuit. The logic circuit includes interface circuits for interface with the Host, the data Buffer, the FMTR and the microprocessor. The BLM address calculation steps, and data Buffer access control steps, are performed by a calculator circuit and a state machine circuit, respectively.

Although the present invention has been described in considerable detail with regard to the preferred versions thereof, other versions are possible. Therefore, the appended claims.

What is claimed is:

1. A controller for coordinating access to a data buffer including a plurality of data blocks for storage of data retrieved from, or to be stored into a storage device, each data block having a size and an address, the controller comprising:

(a) a buffer list including a plurality of entries each corresponding to a data block, each entry for maintaining (i) a partial address common to both the next buffer list entry and a data block corresponding to said next buffer list entry, and (ii) a status code selected from a cyclical set of sequential status codes having a period of N divisible by 2, the status codes sequentially, and alternately, representing the most recent history of a data block, further including: (1) full status, indicating data in the data block has been retrieved from the storage device and is to be stored to the storage device, or (2) empty status, indicating data has been transferred out of the data block to a host or to the storage device;

(b) a store flag for maintaining a status code from said cyclical set representing empty status;

(c) a retrieve flag for maintaining a status code from said cyclical set representing full status, the retrieve flag status code immediately following or immediately preceding the store flag status code in said cyclical set;

(d) a buffer list register for maintaining a memory address of the buffer list;

(e) an offset register for maintaining a partial address common to both a current buffer list entry and the corresponding data block; and (f) a logic circuit configured by program instructions to control the storing of data into, and retrieving of data from the data buffer, said logic circuit:

(1) when storing data into the data buffer:
(i) traverses the buffer list to locate a desired entry by: (1) calculating the address of the current entry by steps including adding the partial address in the offset register to the buffer list base address in the buffer list base address register, (2) determining if the current entry is the desired entry; (3) if not, storing into the offset register, the partial address in the current entry, said partial address being common to both the next buffer list entry and a corresponding data block, and repeat (1)–(2);

(ii) stores data into the data block corresponding to the desired entry with a status code matching the store flag status code, including: (1) calculating the address of the corresponding data block by steps including multiplying the partial address in the offset register with said data block size, and (2) accessing the data block at the calculated block address and storing data therein when the status code of the entry matches the store flag status code;

(iii) accesses the entry at the entry address to update the entry with a status code from said cyclical set next in sequence to the store flag status code, indicating the corresponding data block is full; and (iv) if the entry is at the end of the buffer list, updates the store flag by sequentially advancing the store flag status code in said cyclical set twice; and (2) when retrieving data from the data buffer:

(i) traverses the buffer list to locate a desired entry by: (1) calculating the address of the current entry by steps including adding the partial address in the offset register to the buffer list base address in the buffer list base address register, (2) determining if the current entry is the desired entry; (3) if not, storing into the offset register, the partial address in the current entry, said partial address being common to both the next buffer list entry and a corresponding data block, and repeating steps (1)–(2);

(ii) stores data into the data block corresponding to the desired entry with a status code matching the retrieve flag status code, including: (1) calculating the address of the corresponding data block by steps including multiplying the partial address in the offset register with said data block size, and (2) accessing the data block at the calculated block address and retrieving data therefrom when the status code of the entry matches the retrieve flag status code;

(iii) accesses the entry at the entry address to update the entry with a status code from said cyclical set next in sequence to the retrieve flag status code, indicating the corresponding data block is empty; and (iv) if the entry is at the end of the buffer list, updates the retrieve flag by sequentially advancing the retrieve flag status code in said cyclical set twice.

2. The controller of claim 1, wherein:

(i) each buffer list entry comprises a binary field of at least 2 bits for storing a status code;

(ii) the cyclical set of status codes comprises 0, 1, . . . , N−1;

(iii) the store flag to comprise a binary field of at least 2 bits;

(iv) the retrieve flag to comprise a binary field of at least 2 bits;

(v) the logic circuit program instructions for:

(1) updating an entry, include program instructions for incrementing the contents of the binary field entry by one;

(2) updating the store flag, include program instructions for incrementing the contents of the binary store flag by two; and (3) updating the retrieve flag, include program instructions for incrementing the contents of the binary retrieve flag by two.

3. The controller of claim 2, wherein:

(a) each buffer list entry comprises a two-bit binary field for storing a status code;

(b) the cyclical set of status codes comprise 0, 1, 2, and 3, with the status codes 1 and 3 representing full status, the status codes 0 and 2 representing empty statues, and N being 4;

(c) the store flag comprises a two-bit binary field initialized to the status code 0 from said cyclical set;

(d) the retrieve flag comprises a two-bit binary field initialized to the status code 1 from said cyclical set; and (e) each buffer list entry is initialized status code 0.

4. A controller for providing access to a data buffer, the data buffer including a plurality of data blocks for storing data retrieved from or to be stored in a storage device, each data block having a size and an address, the controller comprising:

(a) a buffer list including a plurality of entries each corresponding to a data block, each entry for maintaining a partial address common to both the next buffer list entry and a data block corresponding to said next buffer list entry;

(b) a buffer list register for maintaining a memory address of the buffer list;

(c) an offset register for maintaining a partial address common to both a buffer list entry and the corresponding data block; and (d) a logic circuit configured by program instructions to provide access to the data blocks, said logic circuit:

(i) calculates the address of a buffer list entry by steps including adding the partial address in the offset register to the buffer list base address in the buffer list base address register; and (ii) calculates the address of the corresponding data block by steps including multiplying the partial address in the offset register with said data block size.

5. The controller of claim 4, wherein the logic circuit program instructions further include program instructions to traverse the buffer list, said logic circuit: (1) stores into the offset register, the partial address in a buffer list entry, said partial address being common to both the next buffer list entry and a corresponding data block, and (2) repeats (d)(i) and (d)(ii) for said next buffer list entry and said corresponding data block.

6. The controller of claim 4, wherein:

(a) each data block further includes a plurality of data sectors of the same size for storing data, each sector having a sector offset within said data block; and (b) the logic circuit program instructions for calculating the address of the corresponding data block include program instructions for calculating the address of a sector within the data block by multiplying said sector size with the sum of the corresponding sector offset and the partial address in the offset register.

7. A controller for coordinating transfer of data into and out of a data buffer, the data buffer including a plurality of data blocks each for storage of data retrieved from, or to be stored into, a storage device, the controller comprising:

(a) a buffer list including a plurality of entries each corresponding to a data block, each entry for maintaining a status code selected from a cyclical set of sequential status codes having a period of N, the status codes sequentially, and alternately, representing the most recent history of a data block, said status codes including: (i) full status, indicating data in the data block has been retrieved from the storage device or is to be stored to the storage device, and (ii) empty status, indicating data has been transferred out of the data block to a host or to the storage device;

(b) a store flag for maintaining a status code from said cyclical set representing empty status;

(c) a retrieve flag for maintaining a status code from said cyclical set representing full status, the retrieve flag status code immediately following or immediately preceding the store flag status code in said cyclical set; and (d) a logic circuit configured by program instructions to control the storing of data into, and retrieving of data from the data buffer, said logic circuit:
  (1) when storing data into the data buffer:
    (i) locates in said buffer list a desired entry;
    (ii) stores data into the corresponding data block when the status code of the entry matches the store flag status code, representing a corresponding empty data block;
    (iii) updates the entry with a status code from said cyclical set next in sequence to the store flag status code, indicating the data block is full; and
    (iv) if the entry is at the end of the buffer list, updates the store flag by sequentially advancing the store flag status code in said cyclical set twice; and
  (2) when retrieving data from the data buffer:
    (i) locates in said buffer list a desired entry;
    (ii) retrieves data from the corresponding data block when the status code of the entry matches the retrieve flag status code, representing a corresponding full data block;
    (iii) updates the entry with a status code from said cyclical set next in sequence to the retrieve flag status code, indicating the data block is empty; and
    (iv) if the entry is at the end of the buffer list, updates the retrieve flag by sequentially advancing the retrieve flag status code in said cyclical set twice.

8. The controller of claim 7, wherein:
(i) each buffer list entry comprises a binary field of at least 2 bits;
(ii) the cyclical set of status codes comprises 0, 1, . . . , N−1;
(iii) the store flag comprises a binary field of at least 2 bits;
(iv) the retrieve flag comprises a binary field of at least 2 bits; and
(v) when the logic circuit:
  (1) updates the entry, the program instructions include program instructions to increment the contents of the binary field entry by one;
  (2) updates the store flag, the program instructions include program instruction to increment the contents of the binary store flag by two; and
  (3) updates the retrieve flag, the program instructions include program instructions to increment the contents of the binary retrieve flag by two.

9. The controller of claim 8, wherein:
(a) each buffer list entry comprises a two-bit binary field;
(b) the cyclical set of status codes comprise 0, 1, 2, and 3, with the status codes 1 and 3 representing full status, the status codes 0 and 2 representing empty status, and N being 4;
(c) the store flag comprises a two-bit binary field initialized to the status code 0;
(d) the retrieve flag comprises a two-bit binary field initialized to the status code 1; and
(e) each buffer is initialized status code 0.

10. The controller of claim 7, wherein the storage device comprises a disk drive.

11. In a data buffer system comprising a data buffer for storing data retrieved from or to be stored in a storage device, the data buffer including a plurality of data blocks for storing data, each data block having a size and an address, a method of providing access to, and coordinating transfer of data into and out of, the data blocks comprising the steps of:

(a) maintaining a buffer list including a plurality of entries each corresponding to a data block, each entry including (i) a partial address common to both the next buffer list entry and a data block corresponding to said next buffer list entry, and (ii) a status code selected from a cyclical set of sequential status codes having a period of N, the status codes sequentially, and alternately, representing the most recent history of a data block, said status codes including: (1) full status, indicating data in the data block has been retrieved from the storage device or is to be stored to the storage device, and (2) empty status, indicating data has been transferred out of the data block to a host or to the storage device;

(b) maintaining in a store flag, a store flag status code consisting of one of said status codes from said cyclical set representing empty status;

(c) maintaining in a retrieve flag, a retrieve flag status code consisting of one said status codes from said cyclical set representing full status, the retrieve flag status code immediately following or immediately preceding the store flag status code in said cyclical set;

(d) initializing each entry of the buffer list to empty status code;

(e) maintaining in a buffer list register, a memory address of the buffer list;

(f) storing in an offset register, a partial address common to both a current buffer list entry and the corresponding data block;

(g) when storing data into the data buffer:
  (1) traversing the buffer list to locate a desired entry by:
    (i) calculating the address of the current entry by steps including adding the partial address in the offset register to the buffer list base address in the buffer list base address register; (ii) determining if the current entry is the desired entry; (iii) if not, storing into the offset register, the partial address in the current entry, said partial address being common to both the next buffer list entry and a corresponding data block, and repeating steps (i)–(ii);
  (2) storing data into the data block corresponding to the desired entry with a status code matching the store flag status code, including: (i) calculating the address of the corresponding data block by steps including multiplying the partial address in the offset register with said data block size, and (ii) accessing the data block at the calculated block address and storing data therein when the status code of the entry matches the store flag status code;
  (3) accessing the entry at the entry address to update the entry with a status code from said cyclical set next in sequence to the store flag status code, indicating the corresponding data block is full; and (4) if the entry is at the end of the buffer list, updating the store flag by sequentially advancing the store flag status code in said cyclical set twice; and (h) when retrieving data from the data buffer:
(1) traversing the buffer list to locate a desired entry by: (i) calculating the address of the current entry by steps including adding the partial address in the offset register to the buffer list base address in the buffer list base address register, (ii) determining if the current entry is the desired entry; (iii) if not, storing into the offset register, the partial address in the current entry, said partial address being common to both the next buffer list entry and a corresponding data block, and repeating steps (i)–(ii);
(2) storing data into the data block corresponding to the desired entry with a status code matching the retrieve flag status code, including: (i) calculating the address of the corresponding data block by steps including multiplying the partial address in the offset register with said data block size, and (ii) accessing the data block at the calculated block address and retrieving data therefrom when the status code of the entry matches the retrieve flag status code;
(3) accessing the entry at the entry address to update the entry with a status code from said cyclical set next in sequence to the retrieve flag status code, indicating the corresponding data block is empty; and
(4) if the entry is at the end of the buffer list, updating the retrieve flag by sequentially advancing the retrieve flag status code in said cyclical set twice.

12. The method of claim 11, wherein:
(i) each buffer list entry comprises a binary field of at least 2 bits for storing a status code;
(ii) the cyclical set of status codes comprises 0, 1, . . . , N−1;
(iii) step (b) further includes defining the store flag to comprise a binary field of at least 2 bits;
(iv) step (c) further includes defining the retrieve flag to comprise a binary field of at least 2 bits;
(v) step (g)(3) further includes incrementing the contents of the binary filed in the entry by one;
(vi) step (g)(4) further includes incrementing the contents of the binary store flag field by two;
(vii) step (h)(3) further includes incrementing the contents of the binary field in the entry by one; and
(viii) step (h)(4) further includes incrementing the contents of the binary retrieve flag by two.

13. The method of claim 12, wherein:
(a) each buffer list entry comprises a two-bit binary field for storing a status code;
(b) the cyclical set of status codes comprise 0, 1, 2, and 3, with the status codes 1 and 3 representing full status, the status codes 0 and 2 representing empty statues, and N being 4;
(c) step of defining the store flag includes defining the store flag to comprise a two-bit binary field initialized to the status code 0 from said cyclical set, representing empty status;
(d) step of defining the retrieve flag includes defining the retrieve flag to comprise a two-bit binary field initialized to the status code 1 from said cyclical set, representing full status; and
(e) step of initializing each buffer list entry includes initializing the entry to the status code 0 from said cyclical set, representing empty status.

14. In a data buffer system comprising at least one data buffer for storing data retrieved from or to be stored in a storage device, the data buffer including a plurality of data blocks each for the storage of data, a method of coordinating storing of data into and retrieving of data from the data buffer, comprising the steps of:

(a) maintaining a buffer list including a plurality of entries each corresponding to a data block, each entry including a status code selected from a cyclical set of sequential status codes having a period of N, the status codes sequentially, and alternately, representing the most recent history of a data block, said status codes including: (i) full status, indicating data in the data block has been retrieved from the storage device or is to be stored to the storage device, and (ii) empty status, indicating data has been transferred out of the data block to a host or to the storage device;
(b) maintaining in a store flag, a store flag status code consisting of one of said status codes from said cyclical set representing empty status;
(c) maintaining in a retrieve flag, a retrieve flag status code consisting of one of said status codes from said cyclical set representing full status, the retrieve flag status code immediately following or immediately preceding the store flag status code in said cyclical set;
(d) initializing each entry of the buffer list to empty status code;
(e) when storing data into the data buffer:
(i) locating in said buffer list a desired entry;
(ii) storing data into the corresponding data block when the status code of the entry matches the store flag status code, representing a corresponding empty data block;
(iii) updating the entry with a status code from said cyclical set next in sequence to the store flag status code, indicating the data block is full; and
(iv) if the entry is at the end of the buffer list, updating the store flag by sequentially advancing the store flag status code in said cyclical set twice; and
(f) when retrieving data from the data buffer:
(i) locating in said buffer list a desired entry;
(ii) retrieving data from the corresponding data block when the status code of the entry matches the retrieve flag status code, representing a corresponding full data block;
(iii) updating the entry with the status code from said cyclical set next in sequence to the retrieve flag status code, indicating the data block is empty; and
(iv) if the entry is at the end of the buffer list, updating the retrieve flag by sequentially advancing the retrieve flag status code in said cyclical set twice.

15. The method of claim 14, wherein:
(i) each buffer list entry comprises a binary field of at least 2 bits;
(ii) the cyclical set of status codes comprises 0, 1, . . . , N−1;
(iii) step (b) further includes defining the store flag to comprise a binary field of at least 2 bits;
(iv) step (c) further includes defining the retrieve flag to comprise a binary field of at least 2 bits;
(v) step (e)(iii) further includes incrementing the contents of the binary filed in the entry by one;
(vi) step (e)(iv) further includes incrementing the contents of the binary store flag field by two;
(vii) step (f)(iii) further includes incrementing the contents of the binary field in the entry by one; and (viii) step (f)(iv) further includes incrementing the contents of the binary retrieve flag by two.

16. The method of claim 15, wherein:

(a) each buffer list entry comprises a two-bit binary field;

(b) the cyclical set of status codes comprise 0, 1, 2, and 3, with the status codes 1 and 3 representing full status, the status codes 0 and 2 representing empty statues, and N being 4;

(c) step of defining the store flag includes defining the store flag to comprise a two-bit binary field initialized to the status code 0 from said cyclical set, representing empty status;

(d) step of defining the retrieve flag includes defining the retrieve flag to comprise a two-bit binary field initialized to the status code 1 from said cyclical set, representing full status; and (e) step of initializing each buffer list entry includes initializing the entry to the status code 0 from said cyclical set, representing empty status.

17. The method of claim 14 wherein the storage device comprises a data disk drive.

18. In a computer system comprising at least one host connected to at least one disk drive through a data buffer system, the data buffer system comprising at least one data buffer for storing data retrieved from or to be stored in the disk drive, the data buffer including a plurality of data blocks each for the storage of data, a method of coordinating storing of data into and retrieving of data from the data buffer by the host and by the disk drive, the method comprising the steps of:

(a) maintaining a buffer list including a plurality of entries each corresponding to a data block, each entry including a status code selected from a cyclical set of sequential status codes having a period of N, the status codes comprising 0, 1, . . . , N−1, and sequentially, and alternately, representing the most recent history of a data block, said status codes including: (i) full status, indicating data has been stored into the data block by the disk drive or by the host, and (ii) empty status, indicating data has been retrieved from the data block by the host or by the disk drive;

(b) maintaining in a store flag, a store flag status code consisting of one of said status codes from said cyclical set representing empty status;

(c) maintaining in a retrieve flag, a retrieve flag status code consisting of one of said status codes from said cyclical set representing full status, the retrieve flag status code immediately following or immediately preceding the store flag status code in said cyclical set;

(d) initializing each entry of the buffer list to empty status code;

(e) when storing data into the data buffer:
  (i) locating in said buffer list a desired entry;
  (ii) storing data into the corresponding data block when the status code of the entry matches the store flag status code, representing a corresponding empty data block;
  (iii) updating the entry with a status code from said cyclical set next in sequence to the store flag status code, indicating the data block is full; and
  (iv) if the entry is at the end of the buffer list, updating the store flag by sequentially advancing the store flag status code in said cyclical set twice; and (f) when retrieving data from the data buffer:
  (i) locating in said buffer list a desired entry;
  (ii) retrieving data from the corresponding data block when the status code of the entry matches the retrieve flag status code, representing a corresponding full data block;
  (iii) updating the entry with the status code from said cyclical set next in sequence to the retrieve flag status code, indicating the data block is empty; and
  (iv) if the entry is at the end of the buffer list, updating the retrieve flag by sequentially advancing the retrieve flag status code in said cyclical set twice.

19. In a data buffer system comprising a data buffer for storing data retrieved from or to be stored in a storage device, the data buffer including a plurality of data blocks for storing data, each data block organized in data sectors having a size, an offset within the data block, and an address, a method of providing access to the data blocks comprising the steps of:

(a) maintaining a buffer list including a plurality of entries each corresponding to a data block, each entry including a partial address common to both the next buffer list entry and a data block corresponding to said next buffer list entry;

(b) maintaining in a buffer list register, a memory address of the buffer list;

(c) storing in an offset register, a partial address common to both a buffer list entry and the corresponding data block;

(d) calculating the address of the buffer list entry by steps including adding the partial address in the offset register to the buffer list base address in the buffer list base address register;

(e) calculating the address of a sector within the corresponding data block by steps including multiplying said sector size with the sum of the corresponding sector offset and the partial address in the offset register; and (f) traversing the buffer list by storing into the offset register the partial address in a buffer list entry, said partial address being common to both the next buffer list entry and a corresponding data block, and repeating steps (d) and (e) for said next buffer list entry and said corresponding data block.

20. In a data buffer system comprising a data buffer for storing data retrieved from or to be stored in a storage device, the data buffer including a plurality of data blocks for storing data, each data block having a size and an address, a method of providing access to the data blocks comprising the steps of:

(a) maintaining a buffer list including a plurality of entries each corresponding to a data block, each entry including a partial address common to both the next buffer list entry and a data block corresponding to said next buffer list entry;

(b) maintaining in a buffer list base address register, the base memory address of the buffer list;

(c) storing in an offset register, a partial address common to both a buffer list entry and the corresponding data block;

(d) calculating the address of the buffer list entry by steps including adding the partial address in the offset register to the buffer list base address in the buffer list base address register; and (e) calculating the address of the corresponding data block by steps including multiplying the partial address in the offset register with said data block size.

21. The method of claim 20 further comprising the steps of traversing the buffer list by storing into the offset register the partial address in a buffer list entry, said partial address being common to both the next buffer list entry and a corresponding data block, and repeating steps (d) and (e) for said next buffer list entry and said corresponding data block.

22. The method of claim 21, wherein:

(a) each data block further includes a plurality of data sectors of the same size for storage of data, each sector having a sector offset within said data block; and (b) the step of calculating the address of the corresponding data block includes steps of calculating the address of a sector within the data block by multiplying said sector size with the sum of the corresponding sector offset and the partial address in the offset register.

* * * * *